(12) United States Patent     (10) Patent No.: US 10,974,083 B2
Cooper et al.     (45) Date of Patent: Apr. 13, 2021

(54) INFLATABLE HARNESS ASSEMBLY FOR AIRCRAFT OXYGEN CREW MASK

(71) Applicant: B/E Aerospace, Inc., Wellington, FL (US)

(72) Inventors: Alice R. Cooper, Kansas City, MO (US); David M. Prueter, Olathe, KS (US)

(73) Assignee: B/E AEROSPACE, INC., Winston-Salem, NC (US)

( * ) Notice: Subject to any disclaimer, the term of this patent is extended or adjusted under 35 U.S.C. 154(b) by 1103 days.

(21) Appl. No.: 15/014,175

(22) Filed: Feb. 3, 2016

(65) Prior Publication Data
US 2016/0228732 A1    Aug. 11, 2016

Related U.S. Application Data

(60) Provisional application No. 62/113,197, filed on Feb. 6, 2015.

(51) Int. Cl.
*A62B 18/08*     (2006.01)
*A62B 7/14*     (2006.01)
(Continued)

(52) U.S. Cl.
CPC .............. *A62B 18/084* (2013.01); *A62B 7/14* (2013.01); *A62B 18/02* (2013.01); *B64D 11/00* (2013.01);
(Continued)

(58) Field of Classification Search
CPC ........... A62B 7/14; A62B 9/04; A62B 18/084; A62B 18/02; A62B 18/025; A61M 16/06
See application file for complete search history.

(56) References Cited

U.S. PATENT DOCUMENTS

| 4,437,462 A | * | 3/1984 | Piljay | A62B 18/084 |
| | | | | 128/207.11 |
| 4,915,106 A | * | 4/1990 | Aulgur | A62B 18/084 |
| | | | | 128/205.24 |

(Continued)

FOREIGN PATENT DOCUMENTS

| FR | 2784900 A1 | 4/2000 |
| GB | 1 274 842 A | 5/1972 |

(Continued)

OTHER PUBLICATIONS

Office action on CN 2016800166466 dated Aug. 2, 2019. 8 pages.
International Search Report and Written Opinion on International application No. PCT/US2016/016756 dated May 27, 2016. 12 pages.

*Primary Examiner* — Margaret M Luarca
(74) *Attorney, Agent, or Firm* — Locke Lord LLP

(57) ABSTRACT

The inflatable harness assembly for an aircraft oxygen crew mask includes one or more inflatable tubes having an outer layer of fabric material with an airtight coating for inflating the inflatable harness assembly. The inflatable tubes include an inner core of resilient, elastic material fixedly connected between first and second ends of the inflatable tubes that biases the inflatable tubes to shorten when the tubes are deflated. Inflation of the tubes them to expand the outer layer of material radially outwardly and lengthen axially, to allow the harness assembly to be placed over the user's head. Deflation of the tubes causes the aircraft inflatable harness assembly to grip the user's head with a desired head tension.

17 Claims, 2 Drawing Sheets

(51) Int. Cl.
*A62B 18/02* (2006.01)
*B64D 11/00* (2006.01)

(52) U.S. Cl.
CPC ...... *A62B 18/025* (2013.01); *B64D 2231/025* (2013.01)

(56) References Cited

U.S. PATENT DOCUMENTS

| | | | | |
|---|---|---|---|---|
| 5,069,205 | A * | 12/1991 | Urso | A62B 18/084 128/201.24 |
| 6,588,424 | B2 * | 7/2003 | Bardel | A62B 17/04 128/206.21 |
| 2003/0000530 | A1 * | 1/2003 | McDonald | A62B 7/14 128/205.25 |
| 2008/0060649 | A1 * | 3/2008 | Veliss | A61M 16/0833 128/205.25 |
| 2014/0130930 | A1 * | 5/2014 | Ragner | F16L 11/118 138/121 |
| 2014/0290665 | A1 | 10/2014 | Libis | |

FOREIGN PATENT DOCUMENTS

| | | | | |
|---|---|---|---|---|
| GB | 2 115 270 A | | 9/1983 | |
| WO | WO-2007110670 A1 | * | 10/2007 | ........... A62B 18/084 |
| WO | WO-2009/115868 A1 | | 9/2009 | |
| WO | WO-2012/017265 A1 | | 2/2012 | |
| WO | WO-2012027792 A1 | * | 3/2012 | ........ A61M 16/0683 |

* cited by examiner

INFLATABLE HARNESS ASSEMBLY FOR AIRCRAFT OXYGEN CREW MASK

CROSS-REFERENCES TO RELATED APPLICATIONS

This application is based upon and claims priority from U.S. Provisional Patent Application No. 62/113,197, filed Feb. 6, 2015, incorporated by reference in its entirety.

BACKGROUND

This invention relates to crew masks to be used in large aircraft for crew safety and in the event of decompression of the cabin. More particularly, the invention relates to the inflatable harness used to secure such a mask in place for use.

A commonly used type of crew mask includes an inflatable head harness with inflatable elastic tubes that are inflated prior to placement of the harness over the head of the user, and that are then deflated to grip the user's head. A valve is connected to the tubes to control inflation by pressurized gas, such as from an oxygen supply of a regulator on the respiratory mask, and deflation.

Another similar type of oxygen supply system includes an oxygen supply with a face mask and an inflatable head harness. A plurality of chemical oxygen generators provide oxygen to a reservoir, to initially inflate the pneumatic head harness and provide an initial breathing supply during the startup of the chemical oxygen generators.

The prior art uses a harness, with an inflatable silicone inner tube, along with a regulator to provide oxygen for pilots. The inflation feature of the harness allows pilots to don the crew mask in a quick manner.

Specifically, the prior art relied on a silicone inner tube that inflated by pressurized oxygen and was constrained to not burst by a porous over-braid. The main reliability issue is that the silicone inner tube is highly susceptible to puncture and abrasion.

In a typical conventional crew mask, illustrated in FIG. 1, an inflatable crew mask assembly includes an inflatable harness 10 connected to an oronasal face seal molding or mask portion 12 formed to fit to a face of a wearer when the inflatable harness is fitted over the wearer's head and properly inflated. A lower forward portion of the mask portion includes a smoke goggle purge flow actuation lever 14, a harness inflation control button 16, a connector 18 between the inflatable harness and an oxygen supply regulator assembly 20, and a control knob 22. The regulator typically supplies breathing oxygen to the mask wearer through ports internal to the lower forward portion of the face seal, and also supplies oxygen or other breathing gas mixtures to the inflatable harness via an oxygen pressure supply hose 24, including a pressure indicator 26, coupling 28, and control 30. The inflatable harness typically includes a rear inflatable tube 32 or strap connected via connectors 34 to a lower inflatable tube 36 connected to the oxygen supply regulator assembly. The inflatable harness may also be adjustable for the size and comfort of the mask once inflated. Upon depression of the harness inflation button the oxygen from its source flows into the harness assembly. The prior art inflatable harness typically consists of an inflatable silicone tube covered with a braided sleeve of Nomex® braided material. The braiding helps the tube withstand higher pressures, and depending on the ratio of length of the Nomex® braided sleeve to tube length, the length of expansion can be controlled in longitudinal direction while the diameter of the Nomex® braided sleeve controls tube expansion in the radial direction. The nominal operating pressure is 70 to 85 psig.

As seen in FIG. 1, there are several sections within the harness assembly with varying length of tubing and associated joints where these sections meet and are held in place with various means. Accessories, such as a back pad and head straps are attached to the Nomex® covered silicone tubes to create the harness shape. One of the main observed failure modes of the prior art is leakage within the harness due to tears in the tube caused by stress and fatigue after repeated inflation cycles. Deformation of the tubing when a harness assembly is subjected to repeated inflation cycles causes the formation of small holes in the tubing that can consequently result in significant leakage from the tubing.

During cycling of the harness assembly, the silicone tubes inflate as oxygen from the crew mask is supplied to the harness assembly, creating an increase in pressure. As noted above, the tubing increases in length in the longitudinal direction, while the radial increase in tube diameter is controlled by the Nomex® sleeve.

Control of the radial diameter of the silicone tube by the Nomex® sleeve, is where the prior art fails to provide a robust assembly. Pleating of the Nomex® braid in manufacturing is both difficult and inconsistent. Once the harness assembly is inflated several times, the Nomex® braid pleats will form an irregular pattern along the length of the tube. This irregularity in pleat spacing creates a non-uniform radial increase in the tube diameter. This non-uniform radial increase in diameter creates areas in the tube length where the diameter will balloon. In these areas, the outer surface of the tube is eroded away, causing a decrease in tube wall thickness and eventual tube failure.

It therefore would be desirable to provide an inflatable harness crew mask with an inflatable harness that is able to inflate and expand over a user's head. It also would be desirable to provide an inflatable harness crew mask with an inflatable harness that has an elastic property so that the harness then contracts and is tight on the user's head. While a typical conventional inflatable harness of an inflatable harness crew mask can perform only an average of 1,000 inflations before failure, it would be desirable to provide an inflatable harness that can be inflated at least 25,000 times without failure.

While the inner inflatable silicone material of a typical conventional inflatable harness of an inflatable harness crew mask experiences plastic deformation over time resulting in the harness becoming increasingly less inflatable for placement of the inflatable harness crew mask over a user's head, as well as loss of tension on the user's head when the harness is deflated, it would be desirable to provide an inflatable harness that is more robust and reliable, and utilizes materials, such as composite textiles, for example, that will not deform plastically and will thus retain their tension force. The present invention meets these and other needs.

SUMMARY OF THE INVENTION

Briefly and in general terms, the present invention provides for an inflatable harness assembly for an aircraft oxygen crew mask that is specifically suitable for meeting oxygen needs for commercial aviation application and specifically for a cockpit crew, utilizing inflatable tubes, such as tubes having an outer layer of fabric material, such as a woven textile, for example, with an inner airtight coating for inflating the inflatable harness assembly, so that inflation of the inflatable harness assembly is performed by inflation of the outer layer of material rather than an inner silicone inner tube. The majority of the material strength of the inflatable tubes is provided by the outer layer of material of the inflatable tubes, and it has been found that the outer layer of material is much more robust against cycling induced failures, while the elasticity of the inflatable tubes of the present invention can be provided by any non-inflatable elastic material, such as an elastic band, for example.

The present invention accordingly provides for an inflatable harness assembly for an aircraft oxygen crew mask to provide a regulated flow of oxygen on board an aircraft for the crew. In a presently preferred aspect, the aircraft inflatable harness assembly includes one or more inflatable tubes having a normally deflated configuration and an inflated configuration. The one or more inflatable tubes are configured to be inflated to cause expansion of the harness assembly to allow the harness assembly to be placed over a user's head, and the one or more inflatable tubes advantageously include an outer layer of fabric material, such as a woven textile, for example, coated with an air impermeable surface coating on at least one surface of the outer layer of fabric material to allow the one or more inflatable tubes to be inflated. In a presently preferred aspect, the one or more inflatable tubes include a plurality of inflatable tubes, and in another presently preferred aspect, the one or more inflatable tubes are two continuous inflatable tubes.

In another presently preferred aspect, the one or more inflatable tubes each include an inner core of resilient, elastic material disposed within the one or more inflatable tubes, respectively, the inner core of resilient, elastic material being fixedly connected between first and second ends of the one or more inflatable tubes, respectively. The inner core of resilient, elastic material is configured to bias the one or more inflatable tubes to a first length when the one or more inflatable tubes are in the normally deflated configuration. Inflation of the one or more inflatable tubes causes the one or more inflatable tubes to expand the outer layer of fabric material radially outwardly and axially to a second length greater than the first length, to cause expansion of the harness assembly to allow the harness assembly to be placed over the user's head, and deflation of the one or more inflatable tubes causes the aircraft inflatable harness assembly to grip the user's head with a desired head tension.

In another presently preferred aspect, the one or more inflatable tubes are pleated in the normally deflated configuration, and smooth in the inflated configuration. In another presently preferred aspect, one or more mask attachment fittings configured to be connected to a crew mask for control of inflation and deflation of the one or more inflatable tubes can be secured to the first end of the one or more inflatable tubes. In another presently preferred aspect, a mask attachment tube can be interfaced with the second end of the one or more inflatable tubes. In another presently preferred aspect, one or more elastic head straps can be connected between the one or more inflatable tubes for adjustment of positioning of the harness assembly on the user's head. In another presently preferred aspect, a back pad can be connected between the one or more inflatable tubes to form a contour of the harness assembly for positioning of the harness on the user's head.

In another presently preferred aspect, the inflatable harness assembly is dimensioned such that its performance is easily optimized by adjusting parameters related to oxygen pressure requirements. In another presently preferred aspect, the inflatable harness assembly is designed to withstand all flow requirements to ensure safe and reliable operation.

Other features and advantages of the present invention will become more apparent from the following detailed description of the preferred embodiments in conjunction with the accompanying drawings, which illustrate, by way of example, the operation of the invention.

DETAILED DESCRIPTION OF THE PREFERRED EMBODIMENTS

While conventional crew masks typically include an inflatable head harness with inflatable elastic tubes that are inflated prior to placement of the harness over the head of the user, and that are then deflated to grip the user's head, the inflatable head harness inflatable elastic tubes commonly are formed of inflatable silicone inner tubes covered by an outer layer of a porous over-braid. The inflatable silicone inner tubes are inflated, and are constrained from bursting by the outer layer of a porous over-braid, but the silicone inner tubes remain susceptible to the gradual formation of small holes in the tubing due to repeated the deformation of the silicone inner tubes by cycles of inflation and deflation of the silicone inner tubes, eventually resulting in significant leakage of inflation pressure from the inflatable head harness inflatable elastic tubes during inflation of the harness, making placement of the harness over the user's head increasingly difficult over time, and potentially life threatening. It is therefore desirable to provide an inflatable harness that is more robust and reliable.

Figure 1:
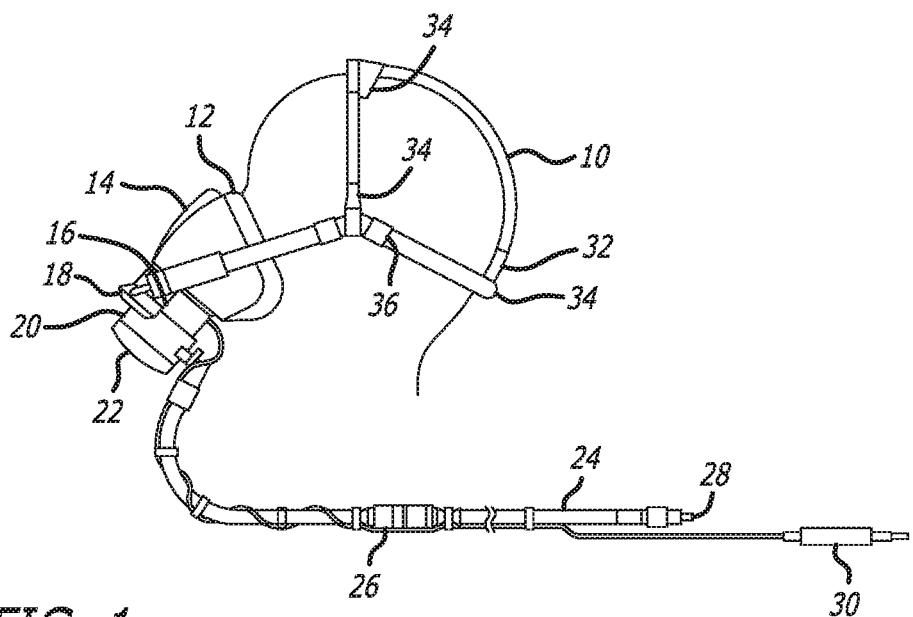
FIG. 1 is a diagram of a prior art crew mask.
Figure 2A:
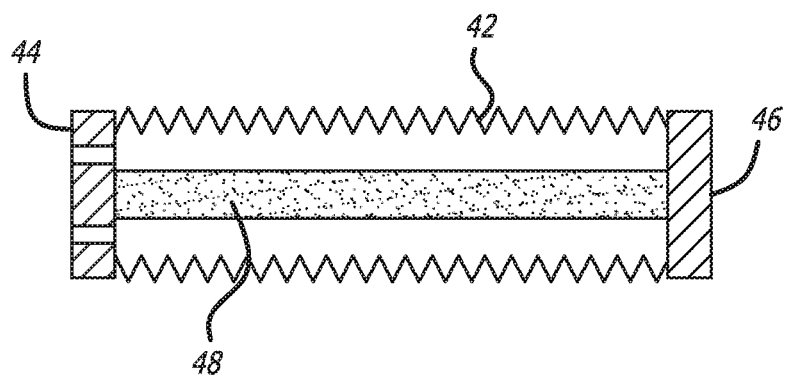
FIG. 2A is a cross-sectional diagrammatic view of an inflatable tube, shown in an uninflated condition, for an inflatable harness assembly for an aircraft oxygen crew mask, according to the invention.
Figure 2B:
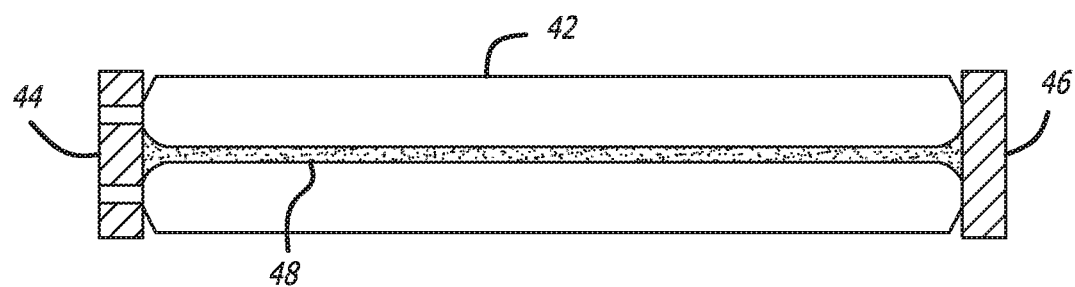
FIG. 2B is a cross-sectional diagrammatic view of the inflatable tube of FIG. 2A, shown in an inflated condition.
Figure 3:
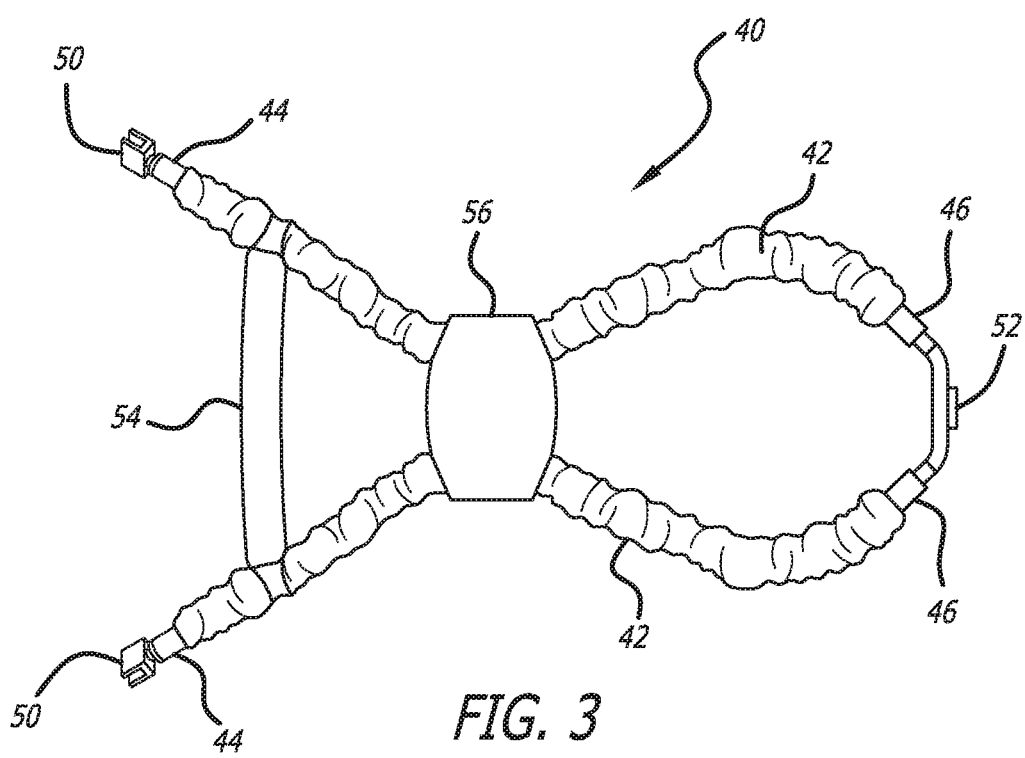
FIG. 3 is an illustration of an inflatable harness assembly for an aircraft oxygen crew mask, according to the invention.

Referring to FIGS. 2A, 2B and 3, the present invention accordingly provides for an aircraft inflatable harness assembly 40 for an aircraft oxygen crew mask to provide a regulated flow of oxygen on board an aircraft for an aircraft crew. The aircraft inflatable harness assembly includes one or more inflatable tubes, and preferably a plurality of inflatable tubes constructed of an outer layer of fabric material with an inner airtight coating to allow the inflatable tubes to be inflated prior to placement of the inflatable harness assembly over the head of the user, and deflated to allow the inflatable harness assembly to grip the user's head. In a presently preferred aspect, the aircraft inflatable harness assembly includes two continuous inflatable outer tubes 42 that can be inflated to cause expansion of the harness assembly to allow the harness assembly to be placed over a user's head. The inflatable outer tubes 42 each have a first end 44 and a second 46, and an inner core of resilient, elastic material 48 is provided within each of the inflatable outer tubes fixedly connected between the first and second ends of the inflatable outer tubes, as is illustrated in FIGS. 2A and 2B. As shown in FIG. 2A, each inner core of resilient, elastic material biases its respective inflatable outer tube to shorter, pleated configuration having a first, shorter length with the inner core of resilient, elastic material in a shortened configuration when the inflatable outer tube is in a normally deflated condition. Inflation of the inflatable outer tube as shown in FIG. 2B causes the inflatable outer tube to expand the pleating of the outer tube radially outwardly to a smooth, lengthened configuration, and the outer tube is lengthened and the inner core of resilient, elastic material is stretched to a second length greater than the first, shorter length, to cause expansion of the harness assembly to allow the harness assembly to be placed over a user's head. Subsequently, after placement over the user's head, upon deflation of the inflatable outer tubes, each inner core of resilient, elastic material is configured to bias its respective inflatable outer tube to the first, shorter, pleated configuration to cause the aircraft inflatable harness assembly to grip a user's head with a desired head tension.

Two mask attachment fittings 50 configured to be connected to a crew mask and regulator for control of inflation and deflation of the inflatable outer tubes are also preferably secured to the first ends 44 of the inflatable outer tubes, and appropriately interfaced with the tube material, as is illustrated in FIG. 3. A mask attachment tube 52 is also preferably interfaced with the second ends 46 of the inflatable outer tubes, and one or more elastic head straps 54 are also preferably connected between the inflatable outer tubes for adjustment of positioning of the harness assembly on the wearer's head. In another presently preferred aspect, a back pad 56 is also preferably connected between the inflatable outer tubes to form a contour of the harness assembly for positioning of the harness on the wearer's head.

A prototype of the aircraft inflatable harness assembly of the invention utilizing as the inner core of resilient, elastic material a silicone tube that has been punctured a number of times along its length so that it cannot inflate but instead can only act as an elastic band has been tested, and has obtained more than 25,000 inflations and deflations and is continuing to operate properly without degradation of the performance of the inflatable outer tubes or the inner core of resilient, elastic material of the inflatable harness assembly.

It will be apparent from the foregoing that while particular forms of the invention have been illustrated and described, various modifications can be made without departing from the spirit and scope of the invention. Accordingly, it is not intended that the invention be limited, except as by the appended claims.

What is claimed is:

1. An aircraft inflatable harness assembly for an aircraft oxygen crew mask for providing regulated flow of oxygen on board an aircraft for an aircraft crew, comprising:
   at least one inflatable tube having a normally deflated configuration and an inflated configuration, said at least one inflatable tube being configured to be inflated to cause expansion of the harness assembly to allow the harness assembly to be placed over a user's head, and said at least one inflatable tube including:
   an outer inflatable tube having a first end and a second end, the outer inflatable tube comprising:
      an outermost layer of fabric material coated with an air impermeable surface coating on an inner surface of said outermost layer of fabric material to allow the outer inflatable tube to be inflated, wherein said at least one inflatable tube is pleated in the normally deflated configuration, and smooth in the inflated configuration; and
      an inner core of resilient, elastic material disposed within the outer inflatable tube, the inner core adjacent to and radially inward from the outermost layer of fabric material, said inner core of resilient, elastic material being fixedly connected between each of the first and second ends of the outer inflatable tube, said inner core of resilient, elastic material being configured to bias the outer inflatable tube to a first length when the outer inflatable tube is in the normally deflated configuration, wherein inflation of the outer inflatable tube causes the outer inflatable tube to expand said outermost layer of fabric material radially outwardly and axially to a second length greater than the first length, to cause expansion of the harness assembly to allow the harness assembly to be placed over the user's head and wherein deflation of the outer inflatable tube causes the aircraft inflatable harness assembly to grip the user's head with a desired head tension.

2. The aircraft inflatable harness assembly of claim 1, wherein said at least one inflatable tube comprises a first inflatable tube having a first end and a second end and a second inflatable tube having a first end and a second end, wherein,
   the first end of the first inflatable tube and the first end of the second inflatable tube are configured to be individually attached to the crew mask, and
   the second end of the first inflatable tube and the second end of the second inflatable tube are coupled to a mask attachment tube indirectly configured to attach to the crew mask.

3. The aircraft inflatable harness assembly of claim 2, further comprising at least one elastic head strap connected between the first inflatable tube and the second inflatable tube for adjustment of positioning of the harness assembly on the user's head.

4. The aircraft inflatable harness assembly of claim 2, further comprising a back pad connected between the first inflatable tube and the second inflatable tube to form a contour of the harness assembly for positioning of the harness on the user's head.

5. The aircraft inflatable harness assembly of claim 1, wherein said at least one inflatable tube comprises two continuous inflatable tubes.

6. The aircraft inflatable harness assembly of claim 5, further comprising at least one elastic head strap connected between said two continuous inflatable tubes for adjustment of positioning of the harness assembly on the user's head.

7. The aircraft inflatable harness assembly of claim 5, further comprising a back pad connected between said two continuous inflatable tubes to form a contour of the harness assembly for positioning of the harness on the user's head.

8. The aircraft inflatable harness assembly of claim 1, further comprising at least one mask attachment fitting secured to the first end of said at least one inflatable tube, said mask attachment fitting being configured to be connected to the crew mask for control of inflation and deflation of said at least one inflatable tube.

9. The aircraft inflatable harness assembly of claim 1, further comprising a crew mask attachment tube interfaced with the second end of said at least one inflatable tube.

10. An aircraft inflatable harness assembly for an aircraft oxygen crew mask for providing regulated flow of oxygen on board an aircraft for an aircraft crew, comprising:
    a plurality of inflatable tubes each having a normally deflated configuration and an inflated configuration, said plurality of inflatable tubes each being configured to be inflated to cause expansion of the harness assembly to allow the harness assembly to be placed over a user's head, and the plurality of inflatable tubes each including:
    an outer inflatable tube having a first end and a second end, the outer inflatable tube comprising:

an outermost layer of fabric material coated with an air impermeable surface coating on an inner surface of said outermost layer of fabric material to allow the outer inflatable tube to be inflated, wherein said plurality of inflatable tubes are pleated in the normally deflated configuration, and smooth in the inflated configuration; and an inner core of resilient, elastic material disposed within the outer inflatable tube, the inner core adjacent to and radially inward from the outermost layer of fabric material, said inner core of resilient, elastic material being fixedly connected between the first and second ends of the outer inflatable tube, respectively, said inner core of resilient, elastic material being configured to bias the outer inflatable tube, to a first length when the outer inflatable tube are in the normally deflated configuration, respectively, wherein inflation of the outer inflatable tube causes the outer inflatable tube to expand said outermost layer of fabric material radially outwardly and axially to a second length greater than the first length, to cause expansion of the harness assembly to allow the harness assembly to be placed over the user's head, and wherein deflation of the outer inflatable tube causes the aircraft inflatable harness assembly to grip the user's head with a desired head tension.

11. The aircraft inflatable harness assembly of claim 10, wherein said plurality of inflatable tubes comprises a first inflatable tube having a first end and a second end and a second inflatable tube having a first end and a second end, wherein;

the first end of the first inflatable tube and the first end of the second inflatable tube are configured to be individually attached to the mask, and the second end of the first inflatable tube and the second end of the second inflatable tube are coupled to a mask attachment tube indirectly configured to attach to the mask.

12. The aircraft inflatable harness assembly of claim 11, further comprising at least one elastic head strap connected between the first inflatable tube and the second inflatable tube for adjustment of positioning of the harness assembly on the user's head.

13. The aircraft inflatable harness assembly of claim 11, further comprising a back pad connected between the first inflatable tube and the second inflatable tube to form a contour of the harness assembly for positioning of the harness on the user's head.

14. The aircraft inflatable harness assembly of claim 10, further comprising at least one mask attachment fitting secured to the first end of said plurality of inflatable tubes, said mask attachment fitting being configured to be connected to a crew mask for control of inflation and deflation of said plurality of inflatable tubes.

15. The aircraft inflatable harness assembly of claim 10, further comprising a mask attachment tube interfaced with the second end of said plurality of inflatable tubes.

16. The aircraft inflatable harness assembly of claim 10, further comprising at least one elastic head strap connected between said plurality of inflatable tubes for adjustment of positioning of the harness assembly on the user's head.

17. The aircraft inflatable harness assembly of claim 10, further comprising a back pad connected between said plurality of inflatable tubes to form a contour of the harness assembly for positioning of the harness on the user's head.

* * * * *